United States Patent [19]
Karp et al.

[11] Patent Number: 5,695,708
[45] Date of Patent: Dec. 9, 1997

[54] THREE DIMENSIONAL FORMING

[75] Inventors: Michael Karp, Holon; Herbert Meningher, Kadima; Yehuda Baron, Netanya, all of Israel

[73] Assignee: Cubital Ltd., North Ra'Anana, Israel

[21] Appl. No.: 577,499

[22] Filed: Dec. 22, 1995

[30] Foreign Application Priority Data

Dec. 25, 1994 [IL] Israel ........................................ 112140

[51] Int. Cl.$^6$ ............................. B29C 35/08; B29C 41/02
[52] U.S. Cl. ......................... 264/401; 264/221; 264/308; 264/317; 264/497; 364/468.26; 364/468.27; 419/36; 425/174.4; 425/215
[58] Field of Search ...................... 264/221, 308, 264/317, 401, 497; 425/174.4, 215; 364/468.26, 468.27; 395/118, 119; 419/36

[56] References Cited

U.S. PATENT DOCUMENTS

| | | | |
|---|---|---|---|
| 4,961,154 | 10/1990 | Pomerantz et al. | 395/119 |
| 5,031,120 | 7/1991 | Pomerantz et al. | 364/468.27 |
| 5,263,130 | 11/1993 | Pomerantz et al. | 395/118 |
| 5,287,435 | 2/1994 | Cohen et al. | 395/118 |
| 5,386,500 | 1/1995 | Pomerantz et al. | 395/119 |

*Primary Examiner*—Leo B. Tentoni
*Attorney, Agent, or Firm*—Abelman, Frayne & Schwab

[57] ABSTRACT

Three-dimensional modeling method and apparatus for receiving information with respect to a three-dimensional object to be formed and for forming a three-dimensional physical object through the use of two building materials and a third filling material. The first building material is typically a photopolymer. The second building material has at least one of the following characteristics: elastomeric properties, engineering plastic thermoset properties, is suitable for lost wax casting, is impregnated with metallic materials, is impregnated with ceramic material, or is sinterable. The filling material is typically a support material to provide structural support to the model during building.

8 Claims, 6 Drawing Sheets

THREE DIMENSIONAL FORMING

FIELD OF THE INVENTION

The present invention relates to three dimensional modeling generally.

BACKGROUND OF THE INVENTION

Various techniques for three dimensional modeling are known in the literature. The following U.S. Patents and Patent application of applicant/assignee, and the prior art referenced therein, are believed to be representative of the state of the art: U.S. Pat. Nos. 4,961,154; 5,031,120; 5,263,130 and 5,287,435 and U.S. Ser. No. 07/867,899. The disclosures of the foregoing patents and patent application are hereby incorporated herein by reference.

SUMMARY OF THE INVENTION

The present invention seeks to provide an improved three-dimensional modeling technique which produces a product having applications which were unavailable using the prior art techniques.

There is thus provided in accordance with a preferred embodiment of the present invention a three-dimensional object forming technique including the steps of:
  receiving information with respect to a three-dimensional object to be formed; and
  providing a three-dimensional physical object using the information by:
    sequentially solidifying a plurality of layers of a first building material;
    adding a filling material to each layer of the first building material, prior to solidification of a subsequent layer of the first building material thereover; and thereafter
    removing the first building material, prior to solidification of a subsequent layer of the first building material thereover; and thereafter
    providing a second building material in place of the first building material prior to solidification of a subsequent layer of the first building material thereover, wherein the second building material has at least one of the following characteristics:
      a. has elastomeric properties;
      b. has engineering plastic properties;
      c. is suitable for use in a lost wax casting process;
      d. comprises a binder material impregnated with metallic powder;
      e. comprises a binder material impregnated with ceramic powder;
      f. is sinterable; and
    removing the filling material after formation of all the layers of the filling and the second building materials.

Further in accordance with a preferred embodiment of the present invention, the second building material forms a geometric shape complementary to the three-dimensional object.

There is also provided in accordance with a preferred embodiment of the present invention a three-dimensional object forming technique including the steps of:
  receiving information with respect to a three-dimensional object to be formed; and
  providing a three-dimensional physical object using the information by:
    sequentially solidifying a plurality of layers of a first building material;
    adding a second building material to each layer of the first building material, prior to solidification of a subsequent layer of the first building material thereover, wherein the second building material has at least one of the following characteristics:
      a. has elastomeric properties;
      b. has engineering plastic properties;
      c. is suitable for use in a lost wax casting process;
      d. comprises a binder material impregnated with metallic powder;
      e. comprises a binder material impregnated with ceramic powder;
      f. is sinterable; and
    removing the first building material after formation of all the layers of the first and the second building materials.

In accordance with a preferred embodiment of the present invention, the second building material forms a geometric shape complementary to the three-dimensional object.

There is also provided in accordance with a preferred embodiment of the present invention a three-dimensional object forming technique including the steps of:
  receiving information with respect to a three-dimensional object to be formed; and
  providing a three-dimensional physical object using the information by:
    sequentially solidifying a plurality of layers of a first building material;
    adding a second building material to each layer of the first building material, prior to solidification of a subsequent layer of the first building material thereover, wherein the second building material has at least one of the following characteristics:
      a. has elastomeric properties;
      b. has engineering plastic properties;
      c. is suitable for use in a lost wax casting process;
      d. comprises a binder material impregnated with metallic powder;
      e. comprises a binder material impregnated with ceramic powder;
      f. is sinterable;
    adding a filling material to each layer of the first and the second building materials, prior to solidification of a subsequent layer of the first and the second building materials thereover; and
    removing the first building and the filling materials after formation of all the layers of the first building, the filling and the second building materials.

Further in accordance with a preferred embodiment of the present invention, the second building material forms a geometric shape complementary to the three-dimensional object.

There is also provided in accordance with a preferred embodiment of the present invention a three-dimensional object former including:
  a receiver operative to receive information with respect to a three-dimensional object to be formed; and
  three-dimensional solidifying apparatus comprising:
    a solidifier operative to sequentially solidify a plurality of layers of a first building material;
    first filling apparatus operative to add a filling material to each layer of said first building material, prior to solidification of a subsequent layer of said first building material thereover;
    a remover operative to remove said first building material, prior to solidification of a subsequent layer of said first building material thereover; and second filling apparatus operative to provide a second building material in place of said first building material prior to solidification of a subsequent layer of said first building material thereover.

There is additionally provided in accordance with a preferred embodiment of the present invention a three-dimensional object former including:

a receiver operative to receive information with respect to a three-dimensional object to be formed; and three-dimensional solidifying apparatus comprising:

a solidifier operative to sequentially solidify a plurality of layers of a first building material; and filling apparatus operative to add a second building material to each layer of said first building material, prior to solidification of a subsequent layer of said first building material thereover.

There is also provided in accordance with a preferred embodiment of the present invention a three-dimensional object former including:

a receiver operative to receive information with respect to a three-dimensional object to be formed; and three-dimensional solidifying apparatus comprising:

a solidifier operative to sequentially solidify a plurality of layers of a first building material;

apparatus for adding a second building material to each layer of said first building material, prior to solidification of a subsequent layer of said first building material thereover;

filling apparatus operative to add a filling material to each layer of said first and said second building materials, prior to solidification of a subsequent layer of said first and said second building materials thereover.

There is also provided in accordance with a preferred embodiment of the present invention, a three-dimensional object comprising a plurality of layers of a material, wherein the material has at least one of the following characteristics:

a. has elastomeric properties;
b. has engineering plastic properties;
c. is suitable for use in a lost wax casting process;
d. comprises a binder material impregnated with metallic powder;
e. comprises a binder material impregnated with ceramic powder;
f. is sinterable.

The three-dimensional object is preferably formed according to any of the abovementioned methods.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
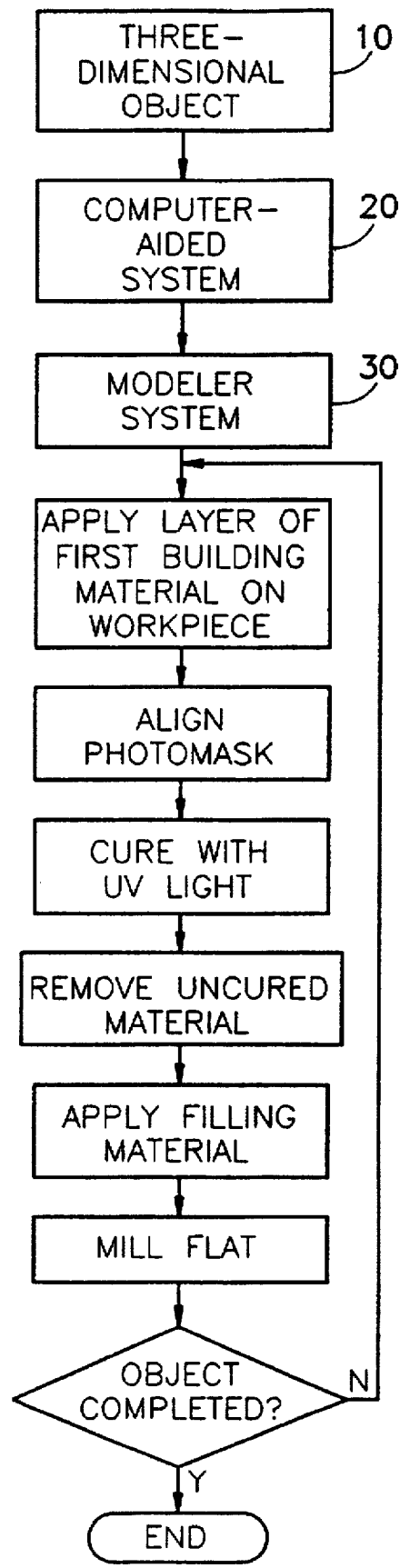
FIGS. 1 and 2 are respectively a flow chart and a simplified sectional illustration of stages in forming three-dimensional objects in accordance with the prior art.
Figure 2:
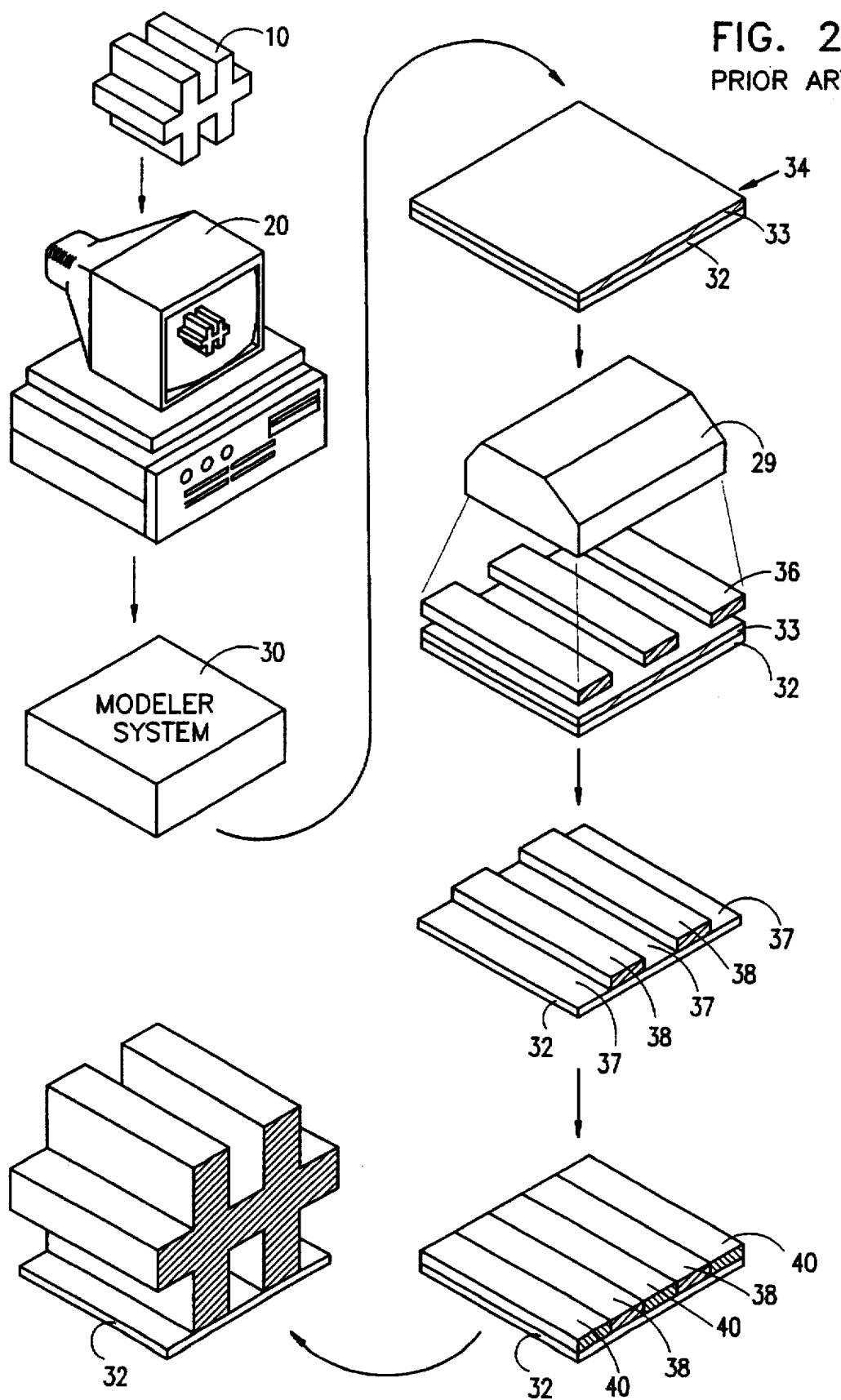

Reference is now made to FIGS. 1 and 2 which illustrate respectively a flow chart and a simplified sectional illustration of stages in forming three-dimensional objects in accordance with the prior art. The geometry of a three-dimensional object 10 is defined in a computer-aided system 20. A modeler system 30, such as Applicant's system based on its U.S. patents and patent application mentioned above and bearing the tradename Solider System, is used to generate a plastic model from the geometry defined in the data base of the computer-aided system 20. Preferably, the modeler system 30 comprises a generally flat workpiece 32 upon which a layer 33 of a first building material 34 is applied, preferably in the form of an ultraviolet light curable liquid photopolymer and generally about 150 microns thick. An example of such a photopolymer is Solimer G5601 manufactured by Coates Coatings Limited. A photomask 36 aligned over the layer 33 and the layer 33 is then cured with an ultraviolet light source 29. Residual uncured photopolymer is then removed, preferably by wiping, leaving gaps 37 between the regions of the cured photopolymer, designated by reference numeral 38. The gaps 37 are then filled with a filling material 40, preferably a wax, which serves as a support medium for the construction of the next layer. The layer is then milled flat and the entire process is repeated for the next layer until formation of the object is completed.

It is noted that the prior art process is capable of producing a plastic model of the object or a plastic mold of the object, the shape of the mold being the complement of the geometry of the desired object. The properties of the object or its mold are limited by the physical and mechanical properties of the ultraviolet light curable photopolymer.

Figure 3:
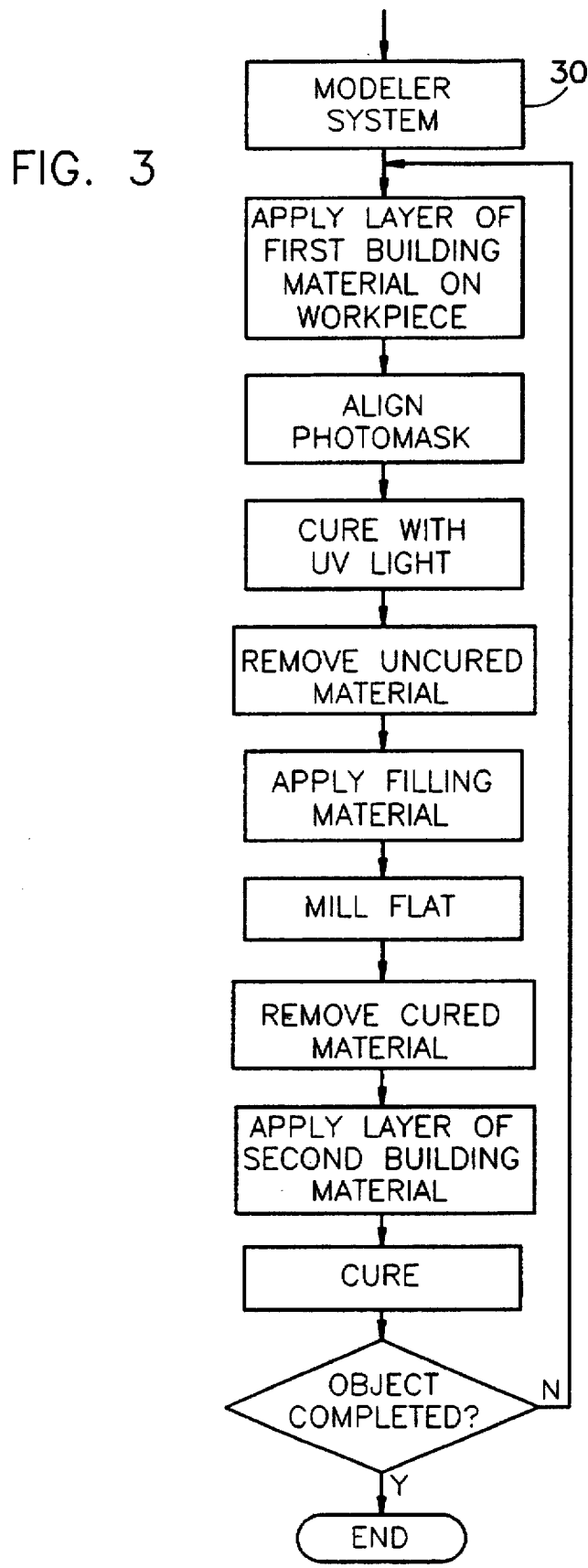
FIGS. 3 and 4 are respectively a flow chart and a simplified sectional illustration of stages in forming three-dimensional objects in accordance with a preferred embodiment of the present invention.
Figure 4:
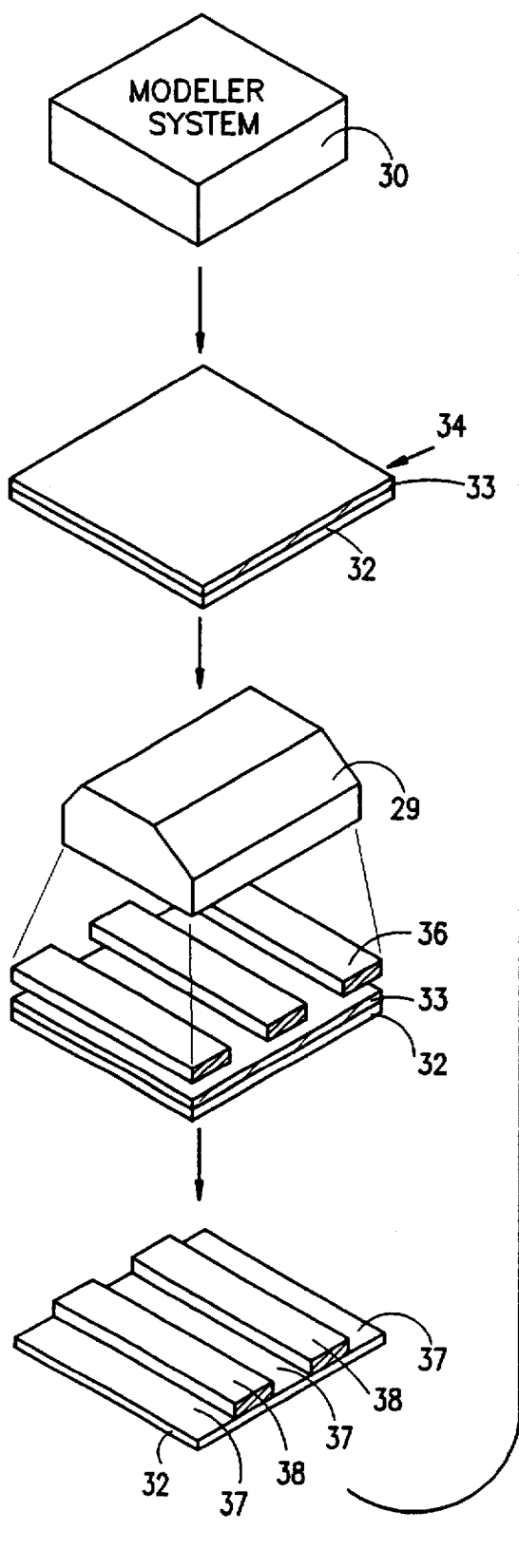
Figure 4:
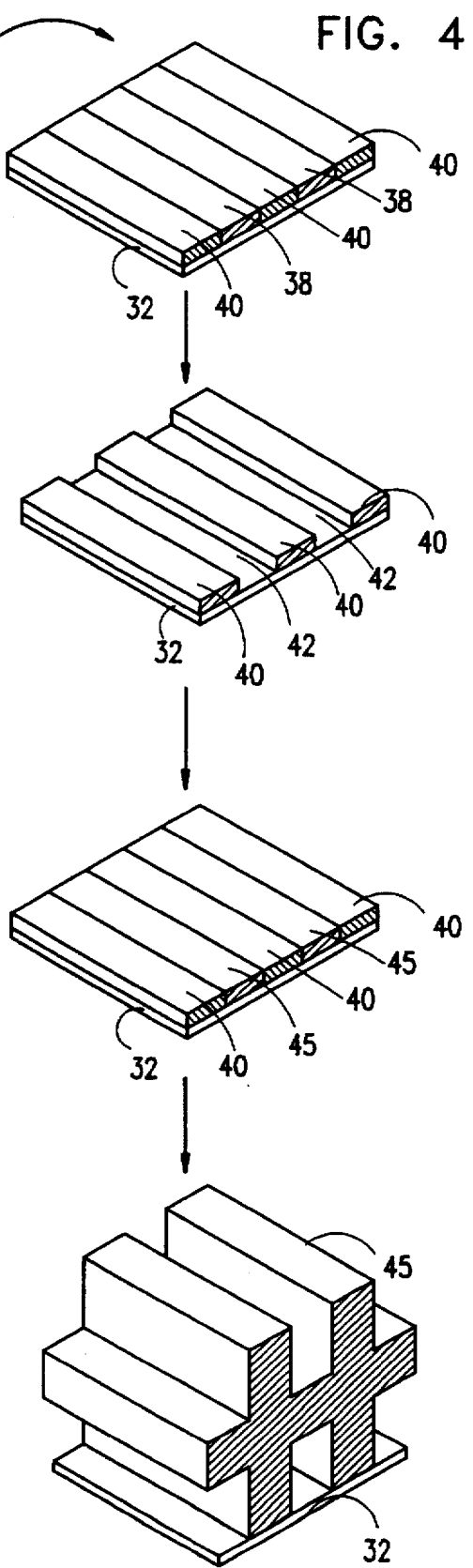

Reference is now made to FIGS. 3 and 4 which illustrate respectively a flow chart and a simplified sectional illustration of stages in forming three-dimensional objects in accordance with a preferred embodiment of the present invention. The process of forming the three-dimensional object is generally the same as that described hereinabove for the prior art up to and including the step of applying the filling material 40. In the present invention, unlike the prior art, before application of the next layer, the cured photopolymer 38 is removed, preferably by peeling, vacuuming or other suitable processes, thereby leaving gaps 42 between the regions of the filling material 40. The gaps 42 are then filled with a second building material 45.

Preferably, the second building material 45 is selected to have physical or mechanical properties which are unavailable in the photopolymer used in the prior art. For example, if elastomeric properties are desired, similar to the properties of polyurethane elastomers, then the second building material 45 may be RIM 630 urethane, manufactured by Hexcel, or 3532 B/A urethane, manufactured by 3M. For achieving properties of engineering plastic thermosets, such as the properties of epoxy thermosets, epoxy EPO 1021 by Hexcel may be chosen. Properties of engineering thermoplastic materials can be achieved by selecting a powder of a thermoplastic material (like PVC or Nylon powder) as the second building material. In this case the powder is applied into the gaps, and then heated until the powder is sintered to form a coherent solid layer. If a model is being formed to be used in a lost wax casting process, then the second building material 45 may be polyurethane 146 or 138, manufactured by Polymers G'vulot of Israel. For metallic properties, Metalset HTA by Loctite or Plasticmetal by Diamant, both including epoxy binder mixed with metal powder, are suitable. For achieving the properties of ceramic materials, CX708 loaded photopolymer can be used. The material has been developed by the Applicant, and it includes photopolymer loaded with fine ceramics powder. This material is applied into the gaps, and at the end of the run it is sintered after debinding the parts, to obtain solid ceramics parts. Powder—binder mixtures can be also used to build metal parts. A mixture of metal powder and thermoplastic binder, like the mixtures employed in the Metal Injection Molding (MIM) process, can be applied into the gaps as the second building material. At the end of the run, the parts can be debinded and sintered to obtain metal parts.

After hardening, the layer may be milled flat, depending on the material, and the entire process may be repeated for the next layer until formation of the object is completed.

It is noted that the foregoing process is applicable to forming a three-dimensional object as well as a mold for the same three-dimensional object, the geometry of the mold being the complement of the geometry of the three-dimensional object. The methods described in the following paragraphs in conjunction with FIGS. 5 and 6 are also applicable for forming three-dimensional objects and their molds.

Figure 5:
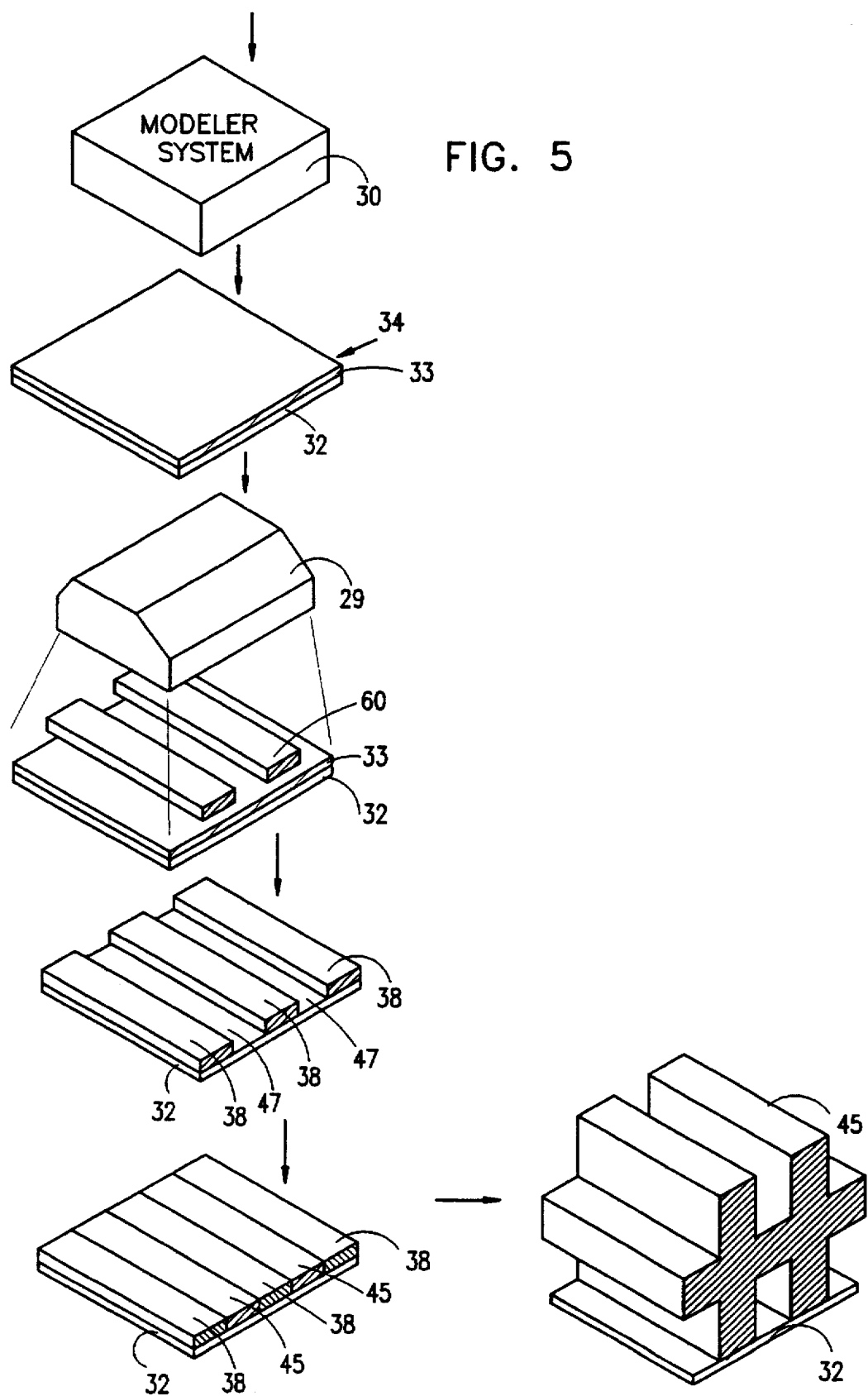
FIG. 5 is a simplified sectional illustration of stages in forming a three-dimensional object in accordance with another preferred embodiment of the present invention.

Reference is now made to FIG. 5 which illustrates a simplified sectional illustration of stages in forming a three-dimensional object in accordance with another preferred embodiment of the present invention. The first building material 34 is applied and selectively cured to conform to the complement of the geometric shape of the desired three-dimensional object using a photomask 60. Residual uncured material is removed and the cured material is milled flat as described above. This process leaves the cured first building material 38 in regions defining the complementary shape of the object and gaps 47 defining the shape of the object. The gaps 47 are then filled with the second building material 45. After solidification, the layer may be milled flat, depending on the material, and the process repeated for the next layer until the part is completely formed. The cured first building material 38 is then removed.

Figure 6:
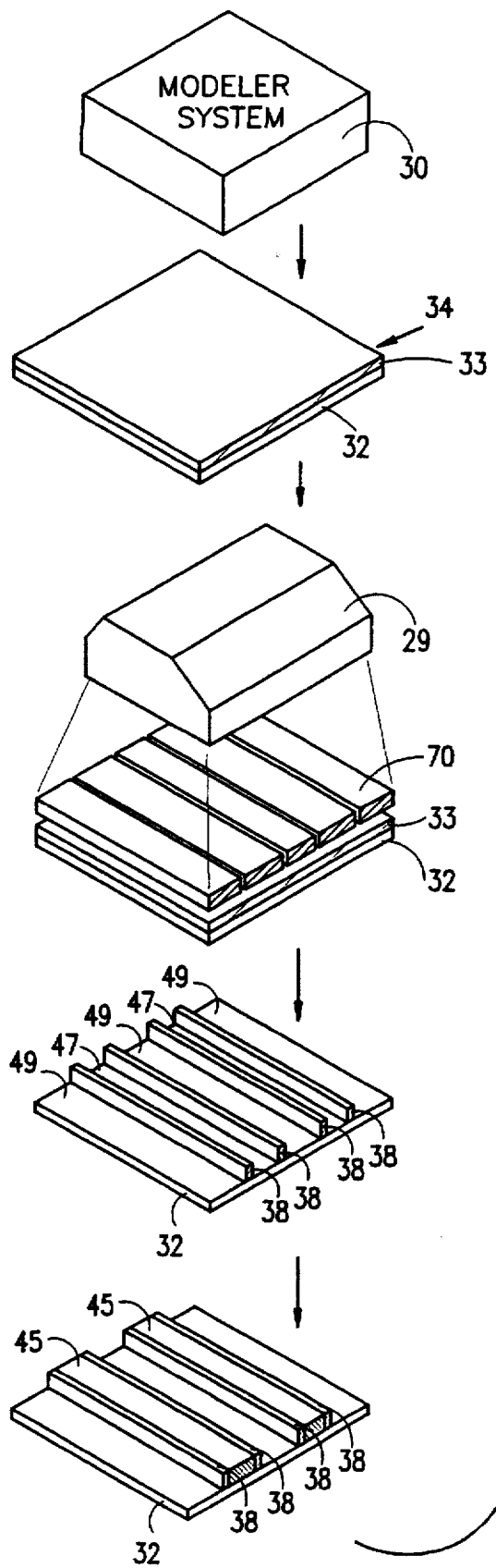
FIG. 6 is a simplified sectional illustration of stages in forming a three-dimensional object in accordance with yet another preferred embodiment of the present invention.
Figure 6:
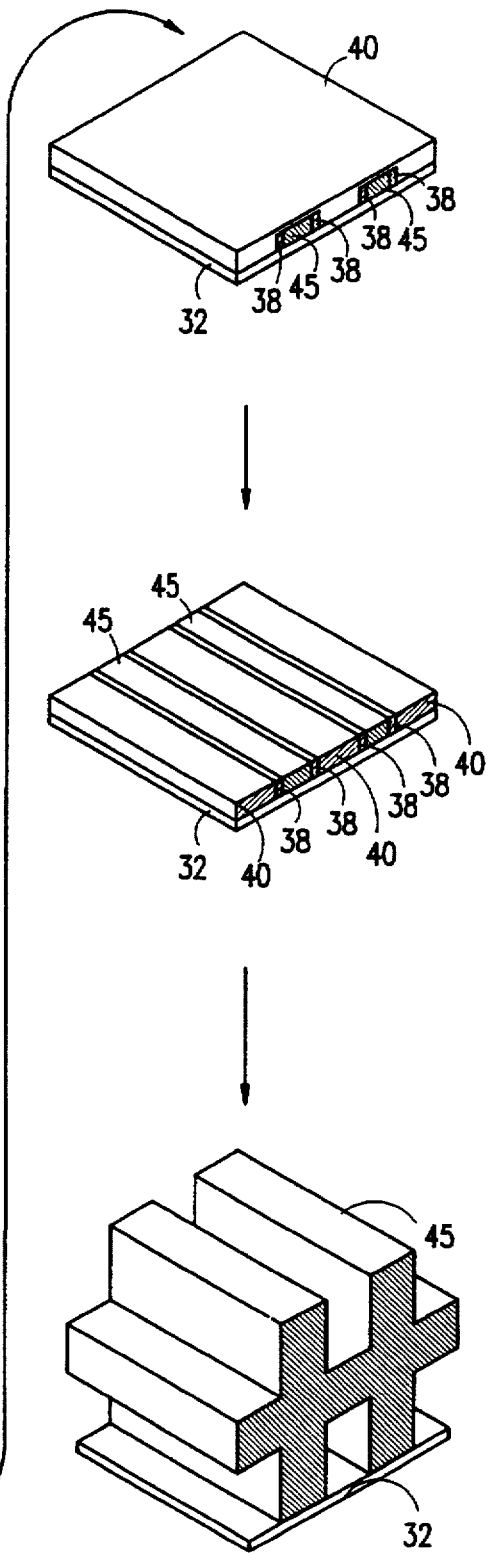

Reference is now made to FIG. 6 which illustrates a simplified sectional illustration of stages in forming a three-dimensional object in accordance with yet another preferred embodiment of the present invention. The first building material 34 is applied and selectively cured using a photomask 70 to conform to the shape of a thin shell surrounding the geometry of the desired three-dimensional object. Residual uncured material is then removed. This process leaves gaps 49 and a thin shell of the cured first building material 38 which define the complementary shape of the three-dimensional object, and gaps 47 which define the shape of the three-dimensional object. The cured first building material 38 may then be milled if desired. The second building material 45 is then applied to fill the gaps 47 and solidified. The filling material 40 is then applied to fill the gaps 49 and further applied to leave a thin film over the cured first building material 38 and the solidified second material 45. A second milling operation is then performed to leave a thin shell of the cured first material 38 bounding a region of the filling material 40, and a region of the solidified second material 45.

It will be appreciated by persons skilled in the art that the present invention is not limited by what has been particularly shown and described hereinabove. Rather the scope of the present invention is defined only by the claims which follow:

I claim:
1. A method of forming three-dimensional objects comprising the steps of:
  receiving information with respect to a three-dimensional object to be formed; and
  forming a three-dimensional physical object using said information by:
    sequentially solidifying a plurality of layers of a first building material;
    adding a filling material to each layer of said first building material, prior to solidification of a subsequent layer of said first building material thereover; and thereafter
    removing said first building material, prior to solidification of a subsequent layer of said first building material thereover; and thereafter
    providing a second building material in place of said first building material prior to solidification of a subsequent layer of said first building material thereover, wherein said second building material has at least one of the following characteristics:
      a. has elastomeric properties;
      b. has engineering plastic properties;
      c. is suitable for use in a lost wax casting process;
      d. comprises a binder material impregnated with metallic powder;
      e. comprises a binder material impregnated with ceramic powder;
      f. is sinterable; and
    removing said filling material after formation of all said layers of said filling and said second building materials.

2. A method according to claim 1 and wherein said second building material forms a geometric shape complementary to said three-dimensional object.

3. A method of forming three-dimensional objects comprising the steps of:
  receiving information with respect to a three-dimensional object to be formed; and
  forming a three-dimensional physical object using said information by:
    sequentially solidifying a plurality of layers of a first building material;
    adding a second building material to each layer of said first building material, prior to solidification of a subsequent layer of said first building material thereover, wherein said second building material has at least one of the following characteristics:
      a. has elastomeric properties;
      b. has engineering plastic properties;
      c. is suitable for use in a lost wax casting process;
      d. comprises a binder material impregnated with metallic powder;
      e. comprises a binder material impregnated with ceramic powder;
      f. is sinterable; and
    removing said first building material after formation of all said layers of said first and said second building materials.

4. A method according to claim 3 and wherein said second building material forms a geometric shape complementary to said three-dimensional object.

5. A method of forming three-dimensional objects comprising the steps of:
  receiving information with respect to a three-dimensional object to be formed; and forming a three-dimensional physical object using said information by:
  sequentially solidifying a plurality of layers of a first building material;
  adding a second building material to each layer of said first building material, prior to solidification of a subsequent layer of said first building material thereover, wherein said second building material has at least one of the following characteristics:
    a. has elastomeric properties;
    b. has engineering plastic properties;
    c. is suitable for use in a lost wax casting process;
    d. comprises a binder material impregnated with metallic powder;
    e. comprises a binder material impregnated with ceramic powder;
    f. is sinterable;
  adding a filling material to each layer of said first and said second building materials, prior to solidification of a subsequent layer of said first and said second building materials thereover; and
  removing said first building and said filling materials after formation of all said layers of said first building, said filling and said second building materials.

6. A method according to claim 5 and wherein said second building material forms a geometric shape complementary to said three-dimensional object.

7. A three-dimensional object former comprising:
  a receiver operative to receive information with respect to a three-dimensional object to be formed; and
  three-dimensional solidifying apparatus comprising:
    first filling apparatus operative to provide a plurality of layers of a first building material;
    a solidifier operative to sequentially solidify said plurality of layers of said first building material;
    second filling apparatus operative to add a filling material to each layer of said first building material, prior to solidification of a subsequent layer of said first building material thereover.
    a remover operative to remove said first building material, prior to solidification of a subsequent layer of said first building material thereover; and
    third filling apparatus operative to provide a second building material in place of said first building material prior to solidification of a subsequent layer of said first building material thereover.

8. A three-dimensional object former comprising:
  a receiver operative to receive information with respect to a three-dimensional object to be formed; and
  three-dimensional solidifying apparatus comprising:
    apparatus for providing a plurality of layers of a first building material;
    a solidifier operative to sequentially solidify said plurality of layers of said first building material;
    apparatus for adding a second building material to each layer of said first building material, prior to solidification of a subsequent layer of said first building material thereover;
    filling apparatus operative to add a filling material to each layer of said first and second building materials, prior to solidification of a subsequent layer of said first and second building materials thereover.

* * * * *